Aug. 7, 1962   D. L. SWEET ETAL   3,048,509
PUNCTURE SEALING MEANS FOR PNEUMATIC TIRES
Filed Dec. 22, 1959

INVENTORS
Donald L. Sweet
Stavros A. Kyriakides
BY McCoy, Greene + LeGrotenhuis
ATTORNEYS 3,048,509
PUNCTURE SEALING MEANS FOR
PNEUMATIC TIRES
Donald L. Sweet and Stavros A. Kyriakides, Cuyahoga Falls, Ohio, assignors to The General Tire & Rubber Company, Akron, Ohio, a corporation of Ohio
Filed Dec. 22, 1959, Ser. No. 861,245
10 Claims. (Cl. 154—43.5)

This invention relates to puncture resistant pneumatic tires and more particularly to a laminated sealing strip which when applied to the interior of a tire serves to seal punctures, and is a continuation-in-part of our copending application Serial No. 648,032, filed March 25, 1957, now abandoned.

The use of plastic puncture sealing compositions including unvulcanized or partially vulcanized rubber on the interior of the tread portion of a pneumatic tire is well known in the art but the use of plastic rubber compositions for protecting tires against puncture has not been satisfactory for general use in automobile tires because of the fact that the heat generated by operation at high speed caused the plastic rubber compositions to deteriorate and become ineffective in a period of time much less than the life of an average tire. Tires frequently operate at relatively high temperatures, sometimes even reaching vulcanizing temperature. The hardening of the unvulcanized or partially vulcanized rubber compositions is believed to have been due mainly to migration of curing agents from the portions of the tire and/or inner tube adjacent the sealing composition.

Such puncture sealing inner tubes have, however, been used quite extensively in taxicab tires because they eliminate delays due to punctures and such inner tubes have given satisfactory service for the reason that most taxicabs are operated in cities and are generally driven at moderate speeds.

In recent years tubeless automobile tires have come into quite general use but lack of a puncture sealing means applicable to the interior of such tires which would permit retreading prevented general acceptance of such tires for taxicab service.

Since taxicab tires are usually retreaded two or three times before they are discarded, any puncture sealing layer permanently attached to the interior of a tubeless tire for taxicab use must employ a sealing layer that will not be deteriorated by the heat applied in the retread vulcanizing mold and that will not adhere to the air bag used to expand the tire tread into the retread vulcanizing mold.

The sealing device of the present invention is a laminated strip adapted to be permanently bonded to the interior of a tire casing and is composed of thin layers of a sealing composition composed of an unvulcanized synthetic rubber compound of low viscosity interposed between thin layers of a synthetic rubber that is substantially impervious to gases and capable of protecting the sealing composition against oxidation and preventing migration of sulfur or other curing agent from the tire body to the sealing composition.

Unvulcanized natural rubber compositions have heretofore been commonly used for sealing compositions because of the fact that such compositions can be protected fairly well against vulcanization by means of vulcanization retarders incorporated in the composition. Unvulcanized natural rubber, when softened with plasticizers, has high film strength which causes it to resist and break under sharp penetrating stress and it has been found necessary to provide a layer of such material that is quite thick in order to obtain effective puncture sealing.

It has been found that uncured synthetic rubber compounds which are copolymers of butadiene and styrene and particularly the polymers of the type originally known as GR–S and now commonly referred to as SBR, when thinned with oil have a much lower film strength and consequent film continuity than natural rubber, but protecting such compositions from vulcanization has presented serious difficulties because of the fact that no vulcanization retarders are known that are effective to prevent vulcanization of such synthetic rubber compositions in service due to migration of sulfur or other curing agent from the body of the tire into the sealing layer.

The provision of a protective covering for the sealing composition such as a layer of vulcanized rubber which would protect the sealing composition from the migration of curing agents from the body of the tire or from the air bag employed in the retread vulcanizing operation is not free from difficulty for the reason that any such covering layer, unless extremely thin, will offer too much resistance to rupture by a nail or other sharp object that has penetrated the tire tread and will cause separation of the sealing strip from the casing and compression of the layers of sealing composition that will prevent proper flow of the sealant to the punctured area. Even when vulcanizerd with a limited amount of vulcanizing agents and substantially free from migratory curing agents, natural rubber and many synthetic rubber compositions which can be firmly bonded to a tire casing wall do not provide effective protection against migration of vulcanizing agents into the sealing composition unless made so thick that they interfere with effective sealing action.

It has been found that certain synthetic rubbers when so compounded and vulcanized that they are substantially free from migratory curing agents, form an effective barrier against the migration of sulfur or other curing agent into the sealing composition even when in the form of extremely thin sheets and that these rubbers may be reinforced with carbon black to provide adequate tensile strength and may be blended with sufficient natural rubber to provide good bonding characteristics without impairing their effectiveness as a protective covering. Synthetic rubbers which are readily available and which have been found suitable for the barrier layers are certain polymers and copolymers such as polymerized chloroprene or butadiene-styrene base polymers known as SBR rubbers. SBR rubber which has been polymerized at a low temperature and which is commonly known as "cold rubber" is preferred.

By confining the tacky sealing composition in thin layers between thin vulcanized barrier layers, flow of the sealing composition due to centrifugal force during operation and due to gravity when standing is so restricted by the barrier layers that a sealing composition of much less viscosity than would otherwise be possible may be used. The use of a reinforcing pigment in the sealing composition is desirable but the pigment should be of such a character that it does not appreciably decrease tackiness.

The sealing composition contains sufficient plasticizer to provide a viscosity considerably lower than that commonly possessed by vulcanizable compositions, the viscosity being too low for measurement on a Mooney plastometer but high enough to permit sheeting on a calender.

The sealing strip of the present invention which provides a sealing composition in the form of thin layers of an uncured synthetic rubber of low viscosity and high film strength protected by thin separating and covering layers of a vulcanized synthetic rubber which provide a barrier against migration of sulfur or other curing agent to the sealing layers, does not interfere with the retreating of the tire casing to which it is employed and, because of its lightness and heat resisting qualities, is suitable for use on tubless tires which are operated at high speeds as well as for taxicab tires.

After the laminated strip of sealing material comprising the unvulcanized rubber composition is formed, it may be applied to the interior of an unvulcanized tire casing or to an inner tube prior to vulcanization of the casing or tube, or the laminated strip may be pre-vulcanized and cemented to the interior of a vulcanized tire casing.

Reference should be had to the accompanying drawings, in which.

Figure 1:
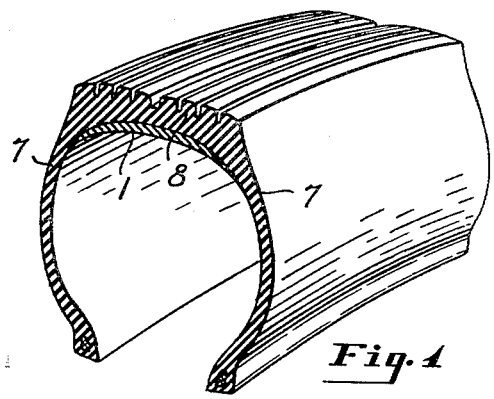
FIGURE 1 is a fragmentary sectional perspective view of a tire embodying the invention.

In the accompanying drawings a sealing strip is shown which has a thin bottom strip 1 of a vulcanized synthetic rubber, a narrower and thicker strip 2 of an unvulcanized sealing composition, a second thin strip of vulcanized synthetic rubber 3 which has edge portions 4 united with the strip 1 beyond opposite side edges of the strip 2, a second strip 5 of unvulcanized sealing composition narrower than the strip 2 and a thin top layer 6 of vulcanized synthetic rubber that is wider than the strip 5 and that is united with the strip 3 beyond opposite side edges of the strip 5.

Figure 2:
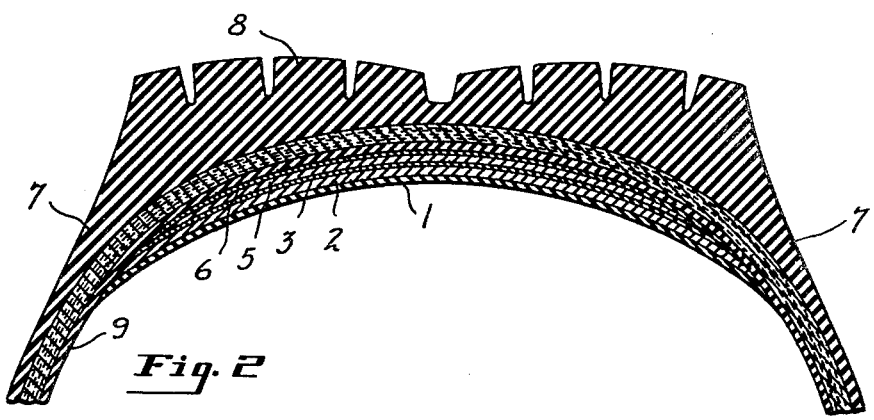
FIG. 2 is a fragmentary transverse section through the tread portion of the tire shown on an enlarged scale.
Figure 4:
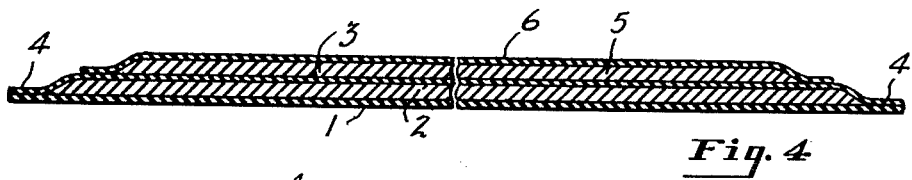
FIG. 4 is a section taken on the line indicated at 4—4 in FIG. 3, shown on an enlarged scale.
Figure 3:
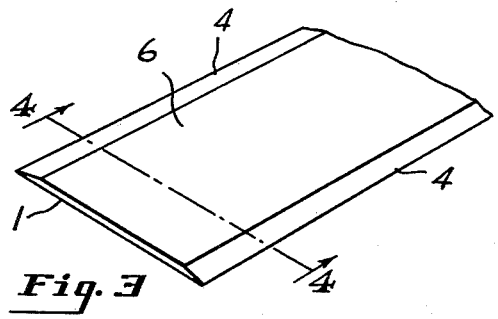
FIG. 3 is a perspective view of a fragment of the sealing strip.

The layers 2 and 5 of sealing composition are assembled with the layers 1, 3 and 6 before vulcanization and may then be applied to the interior of a tire casing 7 within the tread portion 8 thereof as shown in FIGS. 1 and 2 prior to vulcanization of the tire casing. If the tire casing is to be used without an inner tube its interior is covered with a rubber layer 9 to which the sealing strip is applied. Subsequent vulcanization of the tire unites the sealing strip to the rubber layer 9 and firmly bonds the vulcanized layers 1, 3 and 6 to the layers 2 and 5 of sealing composition.

The sheets or layers of soft and sticky sealing composition are made thin so that the plastic material is held by adherence to the vulcanized separating and covering sheets against flow in the spaces between the vulcanized sheets due to centrifugal and other forces to which the sealing strip is subjected in service, but of a thickness sufficient to provide for flow of the sealing material through openings in the covering and separating sheets such as are made when the tire is punctured. The permissible thickness of the sealing sheets will vary with the viscosity of the sealing composition but with the preferred compositions the thickness of the sealing layers should not be more than about one-tenth inch or less than one-twentieth inch. The thickness of the vulcanized covering and separating sheets of the laminated sealing strip should not be materially greater than that necessary to provide the strength necessary to hold the strip to form. The covering sheets are generally not more than one-half the thickness of the sealing sheets and the separating sheets are of less thickness than the covering sheets. The covering sheets may be from one-fortieth to one-twentieth inch in thickness and the separating sheets from one-eightieth to one-fortieth inch in thickness.

The rubber employed in the sealing composition of the present invention is a copolymer of butadiene 1,3 and a styrene containing at least 50 percent by weight of the diene and is preferably a SBR rubber containing no more than 30 percent by weight of styrene. The SBR rubber may be a rubber polymerized to a viscosity within the range of 45 to 65 Mooney for convenient processibility and plasticized to an extent such that its viscosity, while too low for measurement on a Mooney plastometer, is sufficient to permit calendering, or it may be a tough high Mooney polymer polymerized to a viscosity above 65 Mooney and up to 160 Mooney or higher combined with enough additional oil and other plasticizers to provide the desired low viscosity.

The combined oil, resin and other plasticizers required may be as low as 35 parts per 100 rubber for a low Mooney polymer or as much as 115 parts per 100 parts of rubber for a high Mooney polymer, the term "Mooney" as herein used referring to the reading obtained after four minutes at 212° F. on a standard Mooney plastometer using the large rotor.

The so-called oil extended rubbers in which the rubbery constituent is a polymer of from 90 to 160 Mooney viscosity are preferred because they are less expensive and because they have a somewhat greater film strength.

An important ingredient of the puncture sealing composition is a polybutene obtained by polymerization of butenes such as used commercially as a non-oxidizing plasticizer and tackifier. Examples of such polybutenes are Oronite polybutenes produced by Oronite Chemical Company and Vistac, produced by Advance Solvents and Chemical Corporation. The preferred grade of polybutene is a sticky liquid of relatively high viscosity such as Vistac 1 or Oronite Polybutene No. 32 or No. 64. Since the polybutene is unvulcanizable and does not become gummy or waxy or change any essential property after long periods of exposure to air, it not only increases tackiness, but also serves to preserve the plasticity and tackiness of the puncture sealing compound. The sealing composition preferably contains from 10 to 25 parts of polybutene per 100 parts of rubber.

The composition contains, in addition to the polybutene, 10 to 20 parts of a resinous tackifier and enough oily plasticizer to provide the desired low viscosity. The viscosity of the polymer employed may vary from about 45 Mooney to 160 Mooney or higher and with the tougher polymers somewhat larger amounts of tackifiers may be advantageously used and the amount of oily plasticizer employed will be that required to provide a composition of the desired viscosity. The total amount of plasticizer and tackifier in the composition may vary from about 35 parts per hundred rubber for the low Mooney to 115 parts or more for the high Mooney rubber.

Various resinous tackifiers may be employed in the sealing compound of the invention, including hydrogenated rosins, natural wood rosins, coumarone-indene resins, Koresin, and various phenolic tackifying resins. Excellent results may be obtained with a compatible resinous tackifier such as "Butac" a resin acid pine gum softener and tackifier supplied by J. M. Huber Corp. of New York, New York, or "Staybelite Resin," a hydrogenated rosin supplied by Hercules Powder Co., Inc., of Wilmington, Delaware.

The oily plasticizer employed in the puncture-sealing compound of the present invention is preferably an oily hydrocarbon such as a mineral oil. Excellent results may be obtained using a highly aromatic hydrocarbon mineral oil with a boiling point above about 450° F., such as "Philrich 5," supplied by Phillips Petroleum Company; "Sundex 53," supplied by Sun Oil Company; "Dutrex 20 S–1798," supplied by Shell Oil Co., Inc. or the like.

All of the oil may be added to the polymer at the same time, but it is preferable when high Mooney polymers are used to employ a rubber-oil masterbatch produced at a polymerization plant and consisting of the polymer and a substantial amount of an aromatic hydrocarbon oil such as above described. Additional oily plasticizer may be added when the resinous tackifier and other ingredients of the sealing compound are added to the master-batch.

In order to provide a composition which has the viscosity and tackiness necessary to make it effective for puncture sealing, the composition should be compounded with a pigment which can be used in the amount necessary to provide the desirable stiffness without seriously impairing the tackiness of the composition. Commercial grades of black iron oxide have been found to satisfy these requirements.

An excellent puncture-sealing composition may be obtained by using about 50 to 70 parts of commercial black iron oxide per 100 parts by weight of polymer, which oxide consists essentially of black magnetic iron oxide. Such black iron oxide may be obtained from Skelton Mfg. Co. of Cleveland, Ohio, and C. K. Williams Co., of Easton, Pa. Excellent results may be obtained using Mapico black iron oxide manufactured by Mapico Color Division of Columbian Carbon Company and supplied by Binney & Smith Company of New York, New York.

The puncture-sealing compound may also contain a small amount of a suitable antioxidant, such as "B-L-E" or "Age Rite Stalite," said amount preferably being no more than about 2 parts per 100 parts by weight of polymer. "B-L-E" is a high temperature reaction product of diphenylamine and acetone supplied by Naugatuck Chemical Division of United States Rubber Company, New York, New York. "Age Rite Stalite" is heptylated diphenyl-amine supplied by R. T. Vanderbilt, Inc., of New York, New York.

When a retarder such as phthalic anhydride or salicylic acid is included in the composition, the tendency for set up or slight cure at temperatures to which the tire may be subjected in vulcanization during manufacture and in service is further reduced. Other conventional compounding ingredients other than effective amounts of curing agents may also be present in the composition. For example, a small amount of zinc oxide may be present if desired but the amount of any reinforcing pigments present should be limited so that the compound is not too greatly stiffened. Reinforcing pigments such as fine carbon-blacks are preferably absent, or if present, are below 20 parts per 100 of rubber. The preferred amount of retarder is about 5 parts per 100 parts of the rubbery polymer and the preferred amount of zinc oxide, if present, is about 3 parts per 100 parts of the rubbery polymer.

Various high Mooney synthetic rubbers are manufactured by the synthetic rubber plants. One of these is an oil-rubber masterbatch formerly sold under the name GR-S 1712 and now sold under the name SBR-1712 which is typical of the masterbatches which might be used in commercial manufacture. SBR 1712 is a mixture of 100 parts by weight of a copolymer of butadiene and styrene and 37.5 parts of highly aromatic processing oil. This polymer is a cold rubber manufactured by emulsion polymerization at 43° F., using mixed soaps of rosin and fatty acids, a sugar-free iron-activated system, and a carbamate shortstop, approximately 1.25 percent of a staining stabilizer being added to the polymer during manufacture. SBR 1712 is coagulated by the salt-acid procedure, the butadiene-styrene copolymer containing about 22.5 to 24.5 percent of bound styrene. The Mooney viscosity (ML-4) of the SBR 1712 masterbatch (37.5 parts of oil) is about 45 to 65. The copolymer itself has a Mooney viscosity (ML-4) of well over 120. While SBR 1712 is used herein for purposes of illustration, it will be understood that various high Mooney synthetic SBR rubbers may be used.

A preferred composition would comprise a SBR polymer of at least 120 Mooney viscosity combined with from 55 to 65 parts of an aromatic processing oil, 10 to 20 parts of a resinous softener and tackifier, 10 to 25 parts of a polybutene, 40 to 65 parts of black iron oxide and preferably containing a small amount of a retarder and an antioxidant.

A typical recipe for the puncture sealing composition made from a high Mooney polymer is as follows:

| | |
|---|---|
| SBR 1712 (37.5 parts aromatic processing oil) | 137.5 |
| Black iron oxide | 60 |
| Butac resin | 18 |
| Zinc oxide | 3 |
| Aromatic processing oil (Philrich 5) | 20 |
| Polybutene (Vistac 1) | 20 |
| Retarder (phthalic anhydride) | 5 |
| Antioxidant (B.L.E.) | 2 |
| | 265.5 |

A typical low Mooney SBR produced by a polymerization process similar to that by which the SBR 1712 is produced except that the polymerization is controlled to produce a polymer having a viscosity of from 45 to 65 Mooney is SBR 1500.

A typical recipe for the puncture sealing composition made from a low Mooney polymer is as follows:

| | |
|---|---|
| SBR 1500 | 100 |
| Black iron oxide | 43.6 |
| Butac resin | 13.1 |
| Zinc oxide | 2.2 |
| Aromatic processing oil (Philrich 5) | 14.5 |
| Polybutene (Vistac 1) | 14.5 |
| Retarder (phthalic anhydride) | 3.7 |
| Antioxidant (B.L.E.) | 1.5 |
| | 193.1 |

The viscosity of the sealing composition is too low for measurement on the Mooney plastometer. Its Hoekstra plasticity value is from 20 to 35 and preferably not more than 30 measured on a Neodoptifa-Hoekstra plastometer.

The Hoekstra plastometer is a parallel plate compression plastometer commonly used to test samples of rubber compounds being processed in a mixer or mill in order to determine the time of milling required to bring the compound to the desired plasticity for extrusion or molding. A test piece five-eighths inch in diameter and two tenth inch in thickness is placed between the compression plates of the plastometer with a cigarette paper between the test piece and each plate, the piece is compressed to a thickness of 1 mm. heated to 100° C. and then is subjected to a pressure of 10 kg. per square inch for 30 seconds. A dial registers the thickness of the compressed sample in hundredths of a millimeter and this measurement indicates the plasticity value. The plasticity at the end of the milling or mixing operation considered desirable for carcass stock, which is more highly plasticized than tread stock, is from 36 to 50 Hoekstra.

The thin sheets of vulcanized rubber that are laminated with the thicker sheets of sealing composition are of a composition such that they will form a firm band both with the sealing composition and with the rubber of the tube or tire casing. These thin covering sheets should also be resistant to permeation of gases and also to migration of curing agents from the tube or tire to which the sealing strip is attached.

An SBR type of synthetic rubber, because of its resistance to passage of air and to migration of curing agents from the tire or tube, is preferred as the main ingredient of the covering layers. The covering layers may be composed of a suitable SBR alone, but in order to add building tack to improve the unvulcanized adhesive bond between the sealing strip and the tube or tire, it is desirable that a small amount of say from 15 to 25 parts of natural rubber per 100 parts of SBR be included in the composition. Because of the fact that GR-S polymerized at low temperatures and known as "cold rubber" can be easily compounded with natural rubber and forms therewith blends of superior quality, it is preferred that the main ingredient of the rubber compound be cold rubber. It is essential in any event, in order to obtain the main benefits of this invention, that the main rubbery component of the covering layers be a synthetic rubber selected from chloroprene polymer and copolymers of a diolefin and a monovinyl compound such as styrene, etc. The rubber compound must bond well to the hydrocarbon of the tire wall and therefore nitrile rubbers and rubbers not swellable by aromatic oils are undesirable.

To provide the desired tensile strength the rubber compound is preferably reinforced with about 20 to 50 parts of a reinforcing carbon black such for example as high abrasion furnace black per 100 parts rubber. Conventional compounding ingredients such as stearic acid, zinc laurate, zinc oxide and coumarone-indene resins may be included. An oil softener may be included in an amount from 4 to 10 parts per hundred of rubber. An antioxidant such as B.L.E. or "Age Rite Stalite" is also included in the compound in an amount not more than 2 parts per hundred rubber. The compound also includes an antioxidant and suitable curing agents, the amount of curing agent being relatively small so that the vulcanized sheet contains no excess sulfur.

Any of the antioxidants found to be effective for GR-S rubbers may be used in both sealant and covering layers. Examples of commercial antioxidants are B.L.E. and Age-Rite Stalite.

The curing agents employed in the covering layer are of the non-migratory type and comprise a curative which provides the amount of available sulfur required for soft rubber goods which is usually from about 0.5 to 2.5 parts by weight per hundred parts of rubber. Materials which give up sulfur to an adjacent double bond produce vulcanizates of superior resistance to heat aging. Free sulfur in any effective amount is undesirable. Such materials which cure without free sulfur include thiuram disulfide and polysulfides, the alkyl phenyl sulfides and disulfides and certain peroxides such as dicumyl peroxide, and para- and meta-substituted phenol alcohol, 4-tertiary-butyl-2,6-dimethylolphenol and the corresponding 3,5 di-isopropyl 2,6 dimethylol phenol, etc.

An accelerator or combination of accelerator and activator suitable for cold rubber is included in the composition. Suitable accelerators include mercaptobenzothiazole and its derivatives and thiuram sulfides, a combination of a thiazole with an auxiliary accelerator being preferred. The auxiliary accelerator may be an organic amine or amine soap or triethanolamine. Suitable combinations are an accelerator such as ½ to 1 part benzothiazole disulfide and ½ to 1 part of an activator such as a triethanolamine soap or dibutyl-ammonium oleate per hundred parts of rubber. A suitable accelerator combination is also provided by about 1 part of tellurium or selenium and about 1½ parts of tetramethyl-thiurium disulfide, known in the trade as methyl tuad, per hundred parts of rubber.

A typical recipe for the cold rubber cover sheets of the sealing strip is as follows:

| | |
|---|---|
| Cold rubber (SBR–1500) | 80 |
| Natural rubber | 20 |
| H.A.F. black | 40 |
| Zinc laurate | 2 |
| Stearic acid | 1.5 |
| Zinc oxide | 3 |
| Coumarone-indene resin (Picco-100) | 2 |
| Softener (Circosol 2XH) | 6 |
| Antioxidant (B.L.E.) | 1 |
| Vultac No. 2 | 9 |
| Ridacto | 0.7 |
| Nobs No. 1 | 0.9 |

Picco 100 is a trade name for a para coumarone-indene resin with a specific gravity of 1.15 and a melting point of about 100° C.

Circosol 2x14 is a viscous liquid hydrocarbon oil plasticizer with a specific gravity of .94 and a Saybolt viscosity of about 2000 at 100° F.

Vultac #2 is an alkyl phenyl disulfide containing 23% available sulfur for curing.

Ridacto is a reaction product of tall oil and triethanolamine and serves as an activator.

Nobs No. 1 is N-oxydiethylene benzothiazole disulfide and serves as a delayed action accelerator which cooperates with the vultac.

The curing and accelerating ingredients in the above recipe may be substituted by other non-migratory curing ingredients or curing and accelerating ingredients proportioned in accordance with the skill of the art. For example, the last three ingredients may be collectively substituted by about 1 part of selenium or tellurium together with 1.5 parts of methyl tuad, or by about 8 to 10 parts of 4-tertiary-butyl-2,6-dimethylolphenol, etc.

The SBR is preferred in the above recipe but the compound may be substituted by a neoprene base compound to provide a major portion of the benefits obtained from SBR.

The neoprene base compounds suitable for separating and covering layers contain no sulfur, no migratory vulcanizing agents and no compounds capable of decomposing to yield either sulfur or a vulcanization accelerator. The compound has polymerized chloroprene as its base but may contain a small percentage of styrene copolymerized with the chloroprene.

Typical recipes for a sulfur cured neoprene suitable for the covering and separating sheets are as follows:

*Sulfur Cured*

| | |
|---|---|
| Neoprene W | 100 |
| Superla wax | 3 |
| SRF black | 35 |
| Light calcined magnesium oxide | 4 |
| Antioxidant (phenyl-beta-naphthylamine) | 2 |
| Stearic acid | .5 |
| Petrolatum | 2 |
| Zinc oxide | 5 |
| Tetra methyl thiuriam monosulfide | .75 |
| Di ortho tolyl guanidine | .75 |
| Sulfur | 1 |
| | 154 |

*Sulfurless Cure*

| | |
|---|---|
| Neoprene GRT | 100 |
| Petrolatum | 1 |
| Sundex 53 | 5 |
| SRF black | 3 |
| Superla wax | .5 |
| Stearic acid | 2 |
| Thermoflex A antioxidant | 2 |
| Light calcined magnesium oxide | 4 |
| Zinc oxide | 5 |
| | 150.5 |

Neoprene W is a polymerized chloroprene.

Neoprene GRT has a small percentage of styrene copolymerized with chloroprene.

Superla wax is a petroleum wax produced by the Standard Oil Co. of Indiana.

Thermoflex A is a mixture composed of 25% di-p-methoxydiphenylamine, 25% diphenyl-p-phenylene-diamine and 50% phenyl-beta-naphthylamine produced by Du Pont.

The puncture sealing strip resulting from the vulcanization of the laminations comprises thin exterior layers of soft elastic rubber and thicker layers of a very tacky and highly plasticized unvulcanized composition composed of an SBR polymer which maintains its tack and fluidity throughout the range of temperatures to which a tire may be subjected in service, a large proportion of the plasticizers used being of a character such that their fluidity is not greatly affected by temperature changes to which a tire may be subjected in service.

It will be understood that, in accordance with the patent statutes, variations and modifications of the specific methods, compositions and articles disclosed and claimed herein may be made without departing from the spirit of the invention.

What we claim is:

1. A laminated puncture sealing strip for pneumatic tires comprising a plurality of superposed sealing sheets that are not more than about one-tenth inch or less than about one-twentieth inch in thickness and that are composed of a soft sticky unvulcanized synthetic rubber sealing composition comprising a copolymer of butadiene 1.3 and styrene which contains at least 50% by weight of the diene combined with 35 to 115 parts by weight of softening and tackifying agents per 100 parts of the copolymer and with from 35 to 65 parts by weight of a pigment per 100 parts of the copolymer, said softening and tackifying agents and pigments being so proportioned that said sealing composition has a plasticity of from 20 to 35 measured on a Neodoptifa-Hoekstra plastometer, and means for restricting flow of the sealing composition and for protecting the same against deterioration comprising separating and covering sheets alternating with the sealing sheets, said separating and covering sheets being thinner than said sealing sheets and being composed mainly of a vulcanized rubber compound the principal rubbery component of which is selected from the group consisting of a polymer of chloroprene and styrene-butadiene rubbers that contain at least 50% by weight of the diene, said rubber compound being substantially free from sulfur and migratory curing agents.

2. A puncture sealing strip as set forth in claim 1 in which the copolymer of the sealing strip is a butadiene styrene rubber containing no more than 30% styrene.

3. A puncture sealing strip as set forth in claim 1 in which the principal rubbery constituent of the covering and separating sheets is a butadiene styrene rubber containing no more than 30% styrene.

4. A puncture sealing strip as set forth in claim 1 in which the principal rubbery constituent of the separating and covering sheets is a polymer of chloroprene.

5. A laminated sealing strip for pneumatic tires comprising a plurality of superposed sealing sheets composed of a soft and sticky sealing composition comprising an unvulcanized styrene butadiene rubber containing at least 50% by weight of the diene reinforced with a pigment and containing softening and tackifying agents in an amount sufficient to impart to the composition a plasticity of from 20 to 35 as measured on a Neodoptifa-Hoekstra plastometer, said sealing sheets being of a thickness not more than about one-tenth inch and not less than about one-twentieth inch, and means for restricting the flow of the sealing composition and for protecting the same against deterioration comprising covering and separating sheets that are thinner than said sealing sheets, that are composed of a vulcanized styrene-butadiene rubber which contains at least 50% by weight of the diene and that are substantially free from elemental sulfur and migratory curing agents, said covering and separating sheets being wider than the sealing sheets and being integrally joined together outwardly of the side edges of the sealing sheets.

6. A laminated sealing strip as set forth in claim 5 in which the covering sheets are not more than about one-half the thickness of the sealing sheets and the separating sheets are thinner than the covering sheets.

7. A laminated sealing strip for pneumatic tires comprising a plurality of thin superposed sealing sheets that are composed of an unvulcanized rubber composition in which the rubber constituent is a styrene butadiene rubber containing at least 50% by weight of the diene and no more than 30% by weight of styrene of a viscosity of from 45 to 160 Mooney and which is made soft and sticky by the addition of from 30 to 115 parts of plasticizing and tackifying agents which include from 10 to 60 parts of an aromatic high boiling point mineral oil, 10 to 25 parts of polybutene and 10 to 25 parts of a resinous tackifier, said composition having a plasticity of from 20 to 35 measured on a Neodoptifa-Hoekstra plastometer, and means for restricting the flow of said sealing composition and for protecting the same against deterioration in service comprising vulcanized covering and separating sheets that are composed mainly of cold styrene butadiene rubber containing at least 50% by weight of the diene and no more than 30% by weight of styrene and that are substantially free of elemental sulfur and migratory curing agents.

8. A laminated puncture sealing strip for pneumatic tires comprising sheets of soft and sticky unvulcanized sealing composition composed of a styrene butadiene copolymer containing at least 50% by weight of the diene of a viscosity greater than 90 Mooney, 70 to 115 parts of softeners to 100 parts of polymer, 50 to 70 parts of pigments and containing a vulcanization retarder and an anti-oxidant, said composition having a plasticity of from 20 to 35 measured on a Neodoptifa-Hoekstra plastometer, and covering and separating sheets of cold styrene butadiene rubber containing at least 50% of the diene vulcanized in contact with opposite faces of the sealing sheets, each of said sealing sheets being completely covered by said covering and separating sheets, said sealing sheets being not more than about one-tenth inch or less than one-twentieth inch in thickness, said covering sheets being not more than one-half the thickness of the sealing sheets and said separating sheets being thinner than said covering sheets and being substantially free of elemental sulfur and migratory curing agents.

9. A laminated puncture sealing strip for pneumatic tires comprising sheets of unvulcanized sealing composition composed of a styrene butadiene copolymer containing at least 50% by weight of the diene and not more than 30% by weight of styrene, said polymer having a viscosity greater than 90 Mooney, 70 to 115 parts of softeners to 100 parts of polymer, 50 to 70 parts of pigments and containing a vulcanization retarder and an anti-oxidant, said composition having a plasticity of from 20 to 35 measured on a Neodoptifa-Hoekstra plastometer, and separating and covering sheets of a vulcanized rubber composition having 15 to 25 parts of natural rubber blended with from 75 to 85 parts of cold styrene butadiene rubber containing at least 50% by weight of the diene and not more than 30% by weight of styrene vulcanized to opposite faces of the sealing sheets, said sealing sheets being not more than about one-tenth inch or less than one-twentieth inch in thickness and said separating and covering sheets being thinner than said sealing sheets and being substantially free of elemental sulfur and migratory curing agents.

10. A puncture sealing strip for pneumatic tires comprising alternate thin layers of vulcanized rubber composed mainly of cold styrene butadiene rubber containing at least 50% by weight of the diene and not more than 30% by weight of styrene that are substantially free of elemental sulfur and migratory curing agents and intermediate thicker layers of an unvulcanized rubber composition comprising a styrene butadiene copolymer containing at least 50% by weight of the diene and not more than 30% by weight of styrene of a viscosity of at least 90 Mooney containing 35 to 65 parts of an aromatic processing oil having a boiling point of at least 450° F., 15 to 25 parts of a resinous softener, 15 to 25 parts of polybutene and 55 to 65 parts of black iron oxide, said composition having a plasticity of from 20 to 35 measured on a Neodoptifa-Hoekstra plastometer.

References Cited in the file of this patent

UNITED STATES PATENTS

| | | |
|---|---|---|
| 2,039,401 | Foges | May 5, 1936 |
| 2,482,366 | Potters | Sept. 20, 1949 |
| 2,676,636 | Sarbach | Apr. 27, 1954 |
| 2,752,979 | Knill et al. | July 3, 1956 |
| 2,756,801 | Iknayan et al. | July 31, 1956 |
| 2,765,018 | Connell | Oct. 2, 1956 |
| 2,776,693 | Ferrin | Jan. 8, 1957 |
| 2,778,808 | Dunkel et al. | Jan. 22, 1957 |
| 2,905,220 | Schutz | Sept. 22, 1959 |